United States Patent Office 3,472,050
Patented Oct. 14, 1969

3,472,050
LUBRICANT FOR THE PROCESSES OF HOT
EXTRUSION OF METALS AND ALLOYS
Pavel Ivanovich Chuiko, Ulitsa Dobroljubova, 5; Oleg Pavlovich Drobich, Ulitsa Klary Tsetkin, 36, kv. 2; Dusheli Vladimirovich Gerzmava, Ulitsa Zhukovskogo 2b, kv. 24; Anatoly Fedorovich Khamkhotko, Ulitsa Ispolkomovskaya 38, kv. 9; Gennady Ivanovich Gulyaev, Ulitsa Sevastopolskaya 42; and Alexei Evgenievich Pritomanov, prospekt Gagarina 133, kv. 28, all of Dnepropetrovsk, U.S.S.R.; and Iosif Julievich Korobochkin, prospekt Lenina 33, kv. 60; Nikolai Savvich Yakimenko, Ulitsa Novotrobnaya 88, kv. 6; and Grigory Ipatievich Zhulidov, Ulitsa Slavyanskaya 209, kv. 1, all of Nikopol, Dnepropetrovskoi Oblasti, U.S.S.R.
No Drawing. Filed Dec. 21, 1967, Ser. No. 692,264
Int. Cl. B21b 45/02
U.S. Cl. 72—42           2 Claims

ABSTRACT OF THE DISCLOSURE

A method of lubricating blanks and tools in the process of hot extrusion of metals and alloys which comprises using pulverized borosilicate rocks of the datolite or danburite type as a lubricant, said lubricant being instrumental in improving the quality of extruded goods, lending itself to application in a wide temperature range and presenting no difficulties in manufacture.

---

This invention relates to lubricants for the processes of hot extrusion of metals and alloys.

Glass and crystalline lubricants are the most effective materials currently employed in the processes of hot extrusion of metals. Known are glass lubricants disclosed in French Patents 1,014,362 and 1,152,757, British Patent No. 814,558, and U.S.S.R. author's certificates 148,190 and 121,647

The aforementioned references, and author's certificates disclose essentially the application of glass lubricants derived from glasses of diverse chemical composition, the selection of a particularly glass grade being governed by the type of metal to be processed and also by the extrusion temperature. This approach is justified by the fact that the physical properties of glass vary with temperature. Indeed, a glass viscosity vs. temperature graph is a smooth curve the nature of which is governed by the chemical composition of the glass in question. Glass finds lubrication applications in various forms, e.g., as glass cloth, powder (grain size, up to 0.8 mm.), and glass washers.

The disadvantages of glass lubricants which stem from the nature of glass include a wide range of viscosity variations at temperatures from the glass melting point to the metal deformation temperature. The softening temperature of most glass grades used as lubricants lies in the 500–700° C. range, while the majority of steels are subjected to hot extrusion at a temperature of 1,000–1,250° C.

In the course of extrusion, the metal being processed contacts a glass washer placed on a die with a view to lubricating the outer surfaces of the tubes being manufactured, melts a glass layer and entrains molten glass through a die aperture. Due to glass softening to a significant depth, the glass layer thus obtained is, as a rule, quite thick, and the presence of a thick lubricating coat on the contact surface adversely affects the surface quality characteristics of extruded goods.

In England, the Birmingham Institute of Technology, in collaboration with Loewy Engineering Co. Ltd. (Bournemouth), developed basalt-based crystalline lubricants which are superior in their performance characteristics to glass lubricants in so far as the basalt lubricants provide a better surface quailty of pressings and are conducive to increased extrusion rates.

However, the basalt-based crystalline lubricants suffer from the disadvantage of involving an elaborate process for their manufacture. Basalt rocks used as raw material for the preparation of crystalline lubricants are noted for their high melting point (1,250–1,300° C.) and also for variable chemical composition. It is, therefore, imperative to resort to a manufacturing process having the following production sequence:

melting of basalt rocks;
grinding of feed stock;
adjustment of chemical composition;
melting of the adjusted blend;
heat treatment; and
grinding.

The elaborate technology of basalt-based crystalline lubricants calls for the employment of special manufacturing facilities and therefore, limits the application of the lubricants in question.

It is an object of the present invention to provide a lubricant for the processes of hot extrusion of metals and alloys which makes it possible to improve the quality of the extruded goods.

It is another object of the present invention to simplify the crystalline lubricant manufacturing procedure and, thus, render crystalline lubricants readily available in the processes of hot extrusion of meltals or alloys.

These objects of the invention are accomplished by the use of a lubricant comprising borosilicate rocks of the datolite or danburite type used as such after grinding to a grain size of 0.8 mm. in the form of pulverant datalite or danburite concentrates obtained at dressing plants.

The temperature of metal deformation as well as the melting point and structure of the datolite or danburite rock used govern the selection of natural borosilicate stock.

The datolite- or danburite-type natural borosilicate rocks contain predominantly oxides, viz., $B_2O_3$, $SiO_2$ and CaO.

In contradistinction to class which undergoes gradual viscosity variation with temperature, borosilicate rocks of the datolite or danburite type exhibit essentially only one phase transition temperature, viz., the melting point. The latter factor is instrumental in providing a thinner lubricant coat of an appropriate viscosity in the course of extrusion and results in an enhanced quality of extruded goods.

The fact that datolite- and danburite-type borosilicate rocks exhibit diverse melting points warrants their application as lubricants for metal and alloy hot extrusion processes over a wide temperature range.

In the course of hot extrusion the lubricant should be applied in between a die bush and a tool, i.e. at the following sites:

between the internal surface of a container and the external surface of a die bush;
between a mandrel and the internal surface of a die bush; and
between a die and an article being extruded.

Lubrication between the container surface and the die bush is attained by rolling the heated die bush on an inclined table over a layer of pulverant lubricant having a grain size of up to 0.4 mm.

Lubrication between the mandrel and the die bush is attained by coating the inside of the die bush with a lubricant powder (grain size, up to 0.4 mm.), lubricant application being effected while the die bush is being rolled on the table.

Lubrication of the die is provided by the employment of lubricating washers prepared from the pulverant crystalline lubricant of the present invention (grain size, up to 0.8 mm.) and a solution of sodium silicate.

Natural borosilicate rocks of the datolite or danburite type are ground and applied by the same techniques as those elaborated for glass lubricants.

The present lubricant is much cheaper than basalt or glass lubricants.

Tests carried out with a view to evaluating the behavior of datolite and danburite as lubricants in the processes of metal tube extrusion have shown the quality of internal and external tube surface to be as good as that obtained with the basalt lubricant and to be superior to that obtained with the glass lubricant.

For a better understanding of the present invention by those skilled in the art, the following examples are presented by way of illustration.

EXAMPLE 1

In tube extrusion, use is made of danburite as a lubricant for the die and of datolite for lubricating the internal and external surfaces of the die bush on an inclined table.

The blanks are made of stainless steel, grade 18–10; blank temperature, 1,180–1,190° C. The container is 200 mm. in diameter. Extrusion rate, 450 mm./sec., the extrusion ratio being in the range of from 15 to 23.

The finished tubes are noted for their clean and smooth surface, while the tubes extruded in the presence of a glass lubricant display pronounced ripple marks.

EXAMPLE 2

Tubes are produced by the extrusion technique from a hard-forming nickel alloy in the presence of datolite as a die lubricant.

Blank temperature, 1,080° C. Container diameter, 200 mm.

Extrusion rate, 150 mm./sec. Extrusion ratio, 9.

The finished tubes are noted for their satisfactory surface quality, whereas the tubes extruded in the presence of glass lubricants display pronounced pock-marks and also transverse fissures at the front ends.

In the description of a preferred embodiment of the invention, resort has been made to a specific narrow terminology, which in no way limit the scope of the present invention, and it should be borne in mind that every narrow term used embraces all equivalent elements that function in the same manner and find application for accomplishing the same objects.

Although the present invention has been described in accordance with a preferred embodiment thereof, it will be understood by those skilled in the art that various changes and modifications can be resorted to without departing from the spirit and scope of the present invention.

These changes and modifications are to be considered as falling within the spirit and scope of the present invention as defined in the appended claims.

We claim:

1. A method of lubricating blanks and tools in the process of hot extrusion of metals and alloys, said method comprising applying a comminuted borosilicate rock lubricant of the datolite or danburite type to the blank or tool and extruding the same.

2. A method as claimed in claim 1 wherein said borosilicate rocks are comminuted to a grain size below 0.8 mm.

References Cited

UNITED STATES PATENTS 3,180,828   4/1965   Slater et al. _____ 252—28

OTHER REFERENCES

The Merck Index, sixth edition, 1952, pp. 306 and 307.

DANIEL E. WYMAN, Primary Examiner

I. VAUGHN, Assistant Examiner

U.S. Cl. X.R.

252—12, 28